United States Patent [19]

Heybutzki et al.

[11] Patent Number: 5,332,410
[45] Date of Patent: Jul. 26, 1994

[54] SHOCK RESISTANT AND TEMPERATURE-STRAIN RESISTANT MOUNTING FOR TUBULAR PARTICLE FILTERS

[75] Inventors: Helmut Heybutzki, Julich; Horst Stechemesser, Linnich-Tetz; Walter Renftle, Duren, all of Fed. Rep. of Germany

[73] Assignee: Forschungszentrum Jülich GmbH, Jülich, Fed. Rep. of Germany

[21] Appl. No.: 35,648

[22] Filed: Mar. 23, 1993

[30] Foreign Application Priority Data

Mar. 25, 1992 [DE] Fed. Rep. of Germany ....... 4209685

[51] Int. Cl.⁵ .............................................. B01D 46/24
[52] U.S. Cl. ...................................... 55/490; 55/493; 55/498; 55/501; 55/523
[58] Field of Search ................... 55/267, 302, 490, 493, 55/498, 501, 523, DIG. 30

[56] References Cited

U.S. PATENT DOCUMENTS

| 4,735,638 | 4/1988 | Ciliberti et al. ........................ 55/302 |
| 4,867,769 | 9/1989 | Oda et al. ................................ 55/302 |
| 4,979,969 | 12/1990 | Herding ............................... 55/498 X |
| 5,509,227 | 10/1991 | Kilicaslan et al. ..................... 55/490 |

FOREIGN PATENT DOCUMENTS

2118405 10/1972 Fed. Rep. of Germany .

*Primary Examiner*—Charles Hart
*Attorney, Agent, or Firm*—Frishauf, Holtz, Goodman & Woodward

[57] ABSTRACT

A tubular filter with porous silicon carbide for filtering particles of soot out of the exhaust gas of a diesel engine is mounted between two holders in a gas duct where one of the holders is spring loaded and the other has a bore that communicates with a bore connecting with the inside of the filter. The holders have surfaces facing the filter that are concavely spherical. The filter ends are provided with matching convexly spherical surfaces and they are directly on the filter ends or on an intermediate piece tightly seated on the filter end. The spherical surfaces are not necessary at the spring loaded holder and for some embodiments the holder can have a convexly spherical surface. The placing of the filter in a duct does not always permit the holders to be exactly opposite each other, but the filter mounting can be accommodated to somewhat offset holders because the gas tightness of the compression joints remain tight when the position of the filter is slightly oblique in the duct. The same tightness is preserved if for some reason the ends of the tubular filter are in planes that are not quite parallel to each other.

10 Claims, 8 Drawing Sheets

SHOCK RESISTANT AND TEMPERATURE-STRAIN RESISTANT MOUNTING FOR TUBULAR PARTICLE FILTERS

This invention concerns a mounting for tubular filters for filtering particles out of a fluid and, more significantly, out of a hot gas. More particularly it concerns a filter consisting of two filter holders at the respective ends of a tubular filter, of which at least one holder contains a bore serving or supplying or removing gas from the inside of the filtering tubular structure or pipe.

BACKGROUND AND PRIOR ART

A filter of the above-mentioned kind is described and illustrated in German patent application P 41 30 630.9-45 and in a PCT application filed Sep. 9, 1991 which will shortly be published. That filter consists of porous silicon carbide, its shape is that of the tube or pipe and it serves for filtering soot-containing diesel engine exhaust gases, which penetrate through the porous tubular walls into the inside of the filter and are led away through the end surfaces of the closed pipe.

Such a filter needs to be mounted by two holders at its respective ends in such a way that particles in the fluid or gaseous phase do not penetrate through unsealed locations between holders and filter. The imperviousness of sealing must not be impaired either by thermal change in the material, caused for example by hot exhaust gases, or through manufacturing or mounting-imposed tolerances, or even from angular deviation from the intended construction design required by the available locations for mounting devices.

SUMMARY OF THE INVENTION

It is an object of the invention to provide an economical mounting with holders for a tubular particle filter mounted is a gas duct which is convenient to apply and maintain and is capable of withstanding thermal strains and angular disposition deviations.

Briefly, the tubular particle filter is closed at one end where a spring mounting tending to compress the filter axially is provided and at the other end the holder has a bore preferably for exit (but possible for entry) to gas and communicating with the outside of the duct; at least the holder having the bore has spherical surface into which the adjacent open circular end of matching spherical surface of the filter is pressed by the aforesaid spring mounting. This arrangement has the effect when there is an installation-imposed deviation in the angular position of the filter in a duct in which it is mounted there remains a gas tight and stable, close juxtaposition of holders and filter.

Instead of providing a filter with ends fitting the particular holders, it is convenient to provide a separate intermediate piece to be seated between the open end of the filter tube and the apertured spherically matching surface of an adjacent holder. The intermediate piece has a bore which extends to the bore in the holder to the open end of the filter. If then the end of the filter as manufactured, happens to deviate from the circular shape and is consequently, for example, somewhat oval, the intermediate piece can match also such a deviation.

If the filter mounting, along with the filter, is exposed to strong vibrations, as is the case in exhaust gas filters in buses or trucks careful attention must be given to mechanical stability of the construction. In this regard it is advantageous for the holder of the filter at the open end of the filter tube to be rigidly fixed in place. This of course means that only the closed end of the filter will have a spring mounting, but this limitation simplifies the construction and makes manufacture more economical.

If the holder which has the bore for access to the interior of the filter at the open end of the filter tube, that also favors mechanical stability, simplicity of construction and economical manufacture. The stability is such that expensive provisions, such as the insertion of a bellows in the exhaust gas piping becomes unnecessary.

For improving the tightness of a seal before the critical filter to holder transition it is advantageous to provide a ductile insert between the above mentioned intermediate piece and the adjacent end of the filter. Such a seal has the advantage of compensating for unevenness in the adjacent surfaces. In the choice of its material attention must be given to melting points that must be kept above the temperatures to which the filter is exposed.

Some particle filters can be regenerated by bringing the collected particles to incandescence by electric current (see German patent application P 41 30 630.9-45 and also P 41 30 629.5 which corresponds to an European patent application which will shortly be published). For such cases the persisting contacts between holders and filter are sufficient for applying electric voltage to the filter. For this purpose, if ductile seals are provided between intermediate pieces and respective ends of the filter, those seals should of course be electrically conducting and their composition should be selected for minimizing ohmic resistance.

Ductile seals in the form of foils of gold, silver, aluminum or graphite are of increasing desirability in the filtering of soot in the exhaust gas of diesel buses and trucks.

BRIEF DESCRIPTION OF THE DRAWINGS

The invention is further described by way of illustrative example, in the annexed drawings, in which.

DESCRIPTION OF THE ILLUSTRATED EMBODIMENTS

Figure 1:
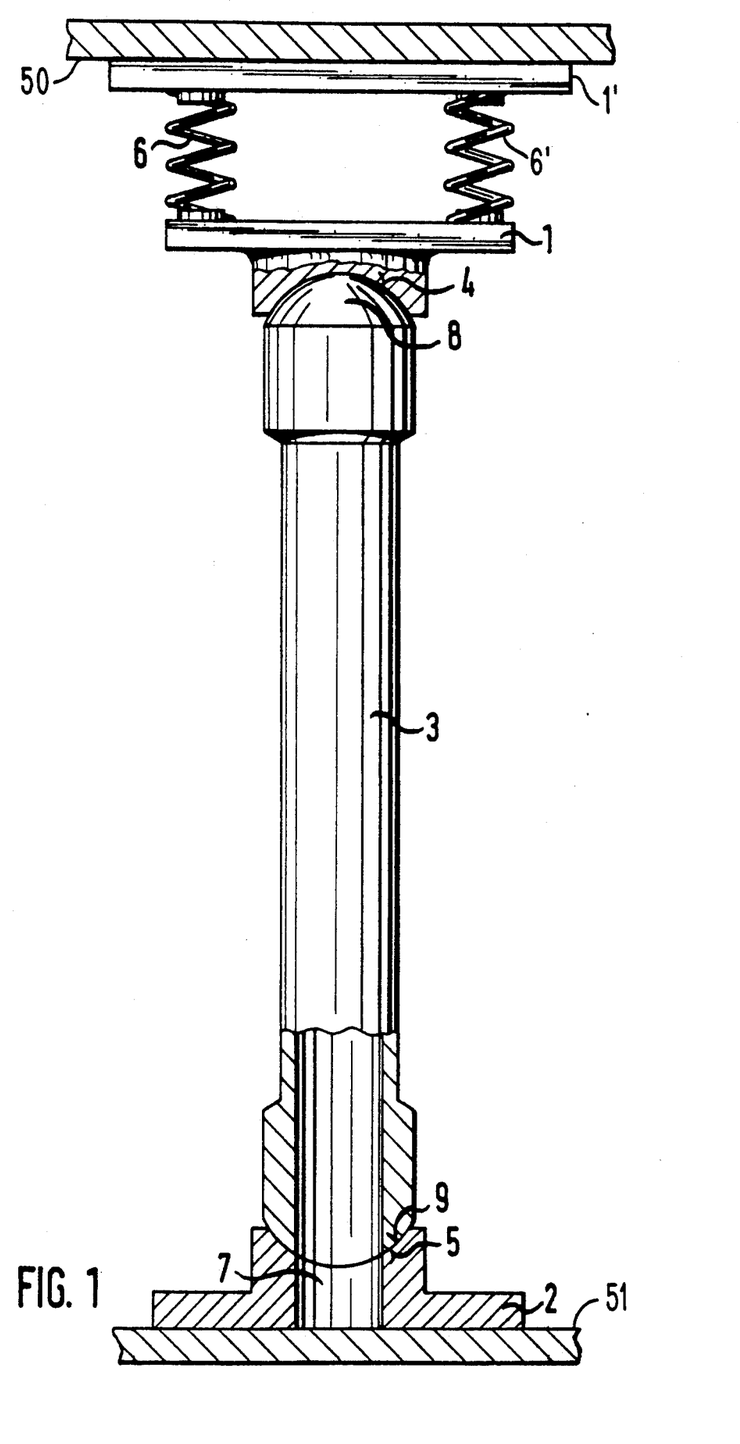
FIG. 1 is a schematic side view, partly in section showing a tubular filter mounted, in accordance with the invention, in holders, of which one is spring mounted.

FIG. 1 shows two holders (1 and 2) in which the respective ends of a tubular filter 3 are held in a mounting according to the invention. The holder 1 is spring loaded by springs 6, 6' and is fastened by its upper plate 1' to the inside of a wall 50 of a duct carrying gas to be filtered. The holder 2 is rigidly attached to an opposite wall 51 of the same duct both the rigidly mounted holder 2 and the resiliently mounted holder 1 have a concave spherical surface, respectively 4 and 5 for the holders 1 and 2, into which the respective filter ends 8 and 9 are seated.

The spring mounting 6,6' is pre-compressed and the filter 3 is inserted between the holders, which thus provide a firm seating of the filter. In the rigidly fixed holder 2 there is a bore 7 that leads to the inside of the filter 3.

The illustrated filter 3 has spherically convex end surfaces 8 and 9 which fit the concavely spherical shapes 4 and 5.

Figure 2:
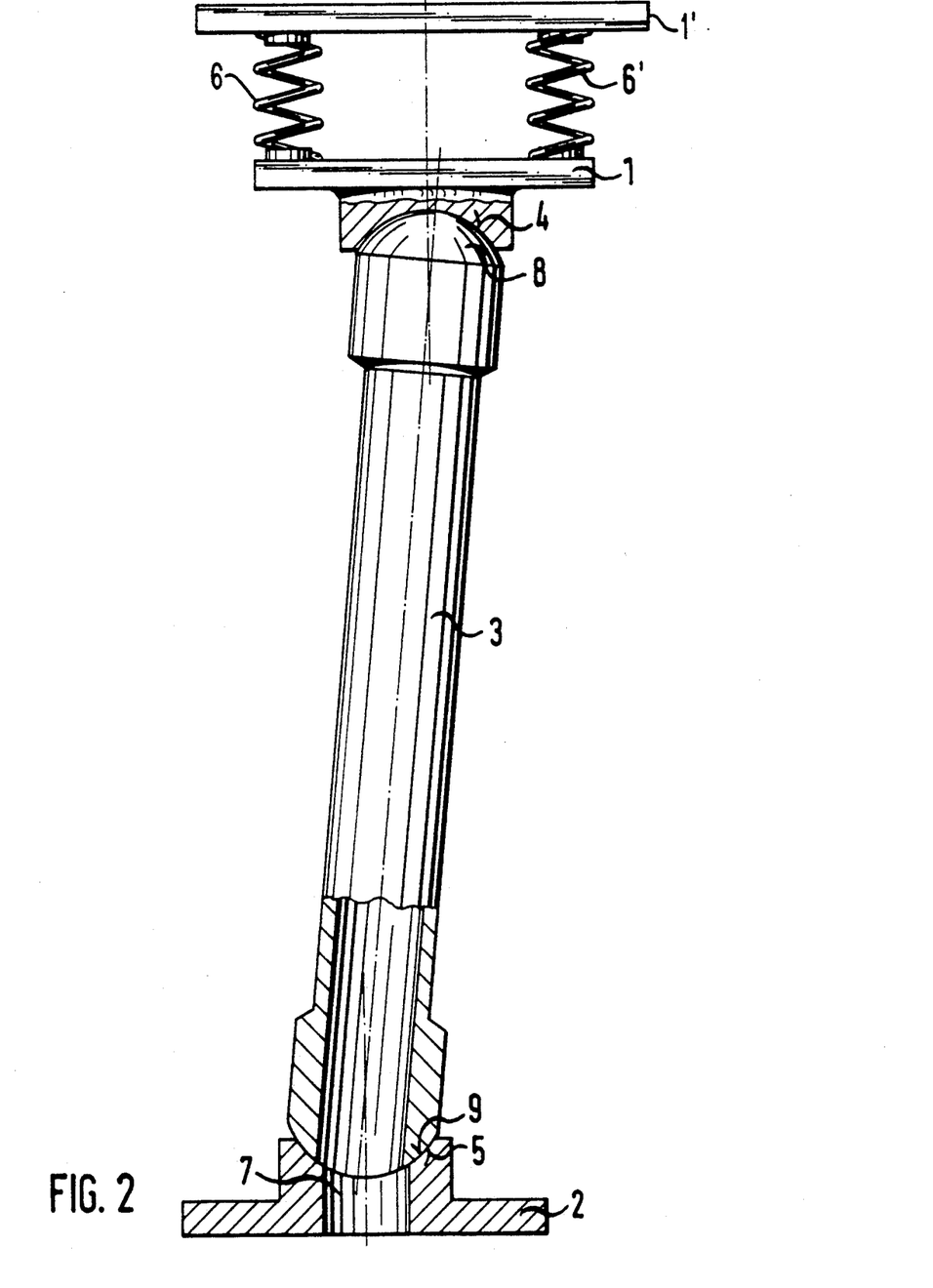
FIG. 2 shows the filter of FIG. 1 and its mounting when subjected to an angular shift imposed on the filter.

FIG. 2 shows the same construction as FIG. 1, but with a different angular position of the filter 3 required by the mounting possibilities imposed by the particular duct (not shown) in which the filter is installed. The holders 1 and 2 are offset from each other in the horizontal direction. In consequence, there is a similar shift of the ends of the filter 3, so that the filter is seated at a different angle between the holders as compared with FIG. 1. As a result of the spherically concave surfaces 4 and 5 for the holders, the necessary tight seal between filter ends and the holders is maintained and the bore 7, which is correspondingly dimensioned, exclusively produces the connection to the inside of the tubular filter 3.

Figure 3:
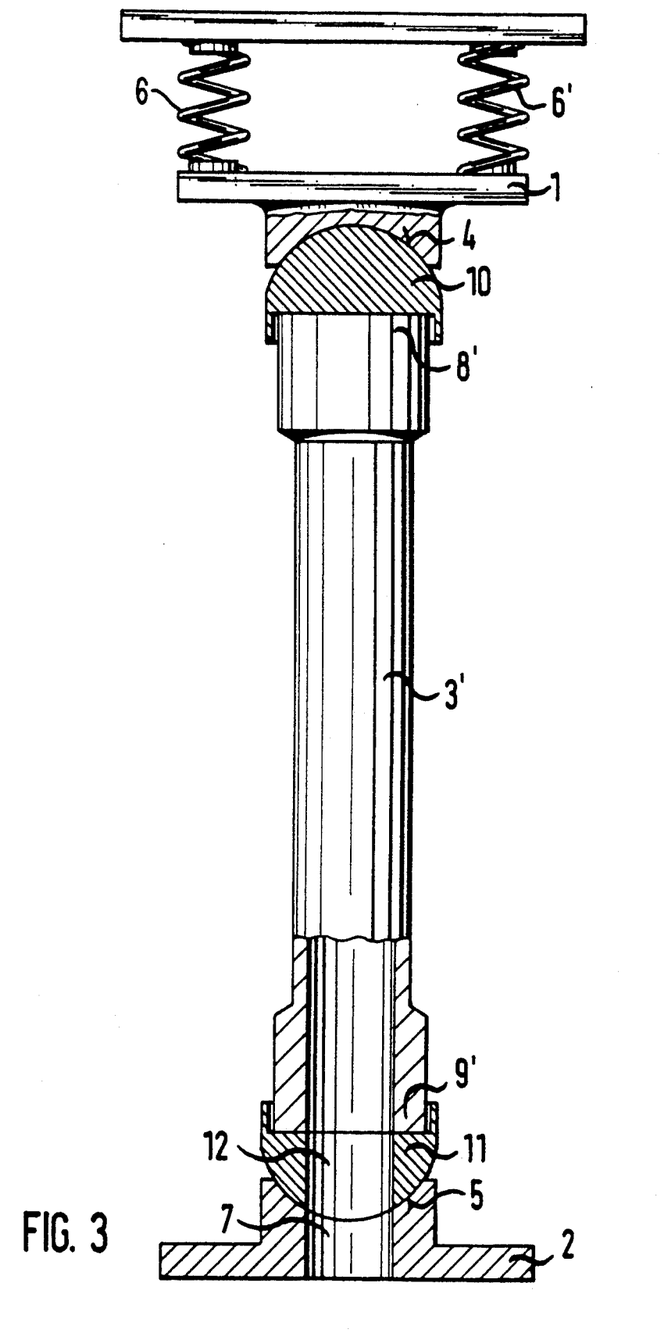
FIG. 3 shows a modification of the filter and mounting of FIG. 1, in a view of the same aspect.

FIG. 3 shows a construction like that of FIG. 1, modified by the provision of intermediate pieces 10 and 11 between holders and filters. The filter 3' in this case has parallel radial plane end surfaces 8' and 9'. The intermediate pieces 11 and 12 are spherically convex where they face their respective holders and fit to the spherically concave surfaces 4 and 5 of the holders. On their surfaces facing the ends of the filter 3' they have surfaces mating the ends of the tubular filter 3' and each have a cavity facing the filter end in which the respective filter end is seated.

The bore 7 in the rigidly fixed holder 2 is compatible with the bore 12 in the adjacent intermediate piece 11, so that access and exit from the interior of the tubular filter 3' is provided through the intermediate piece 11.

Figure 4:
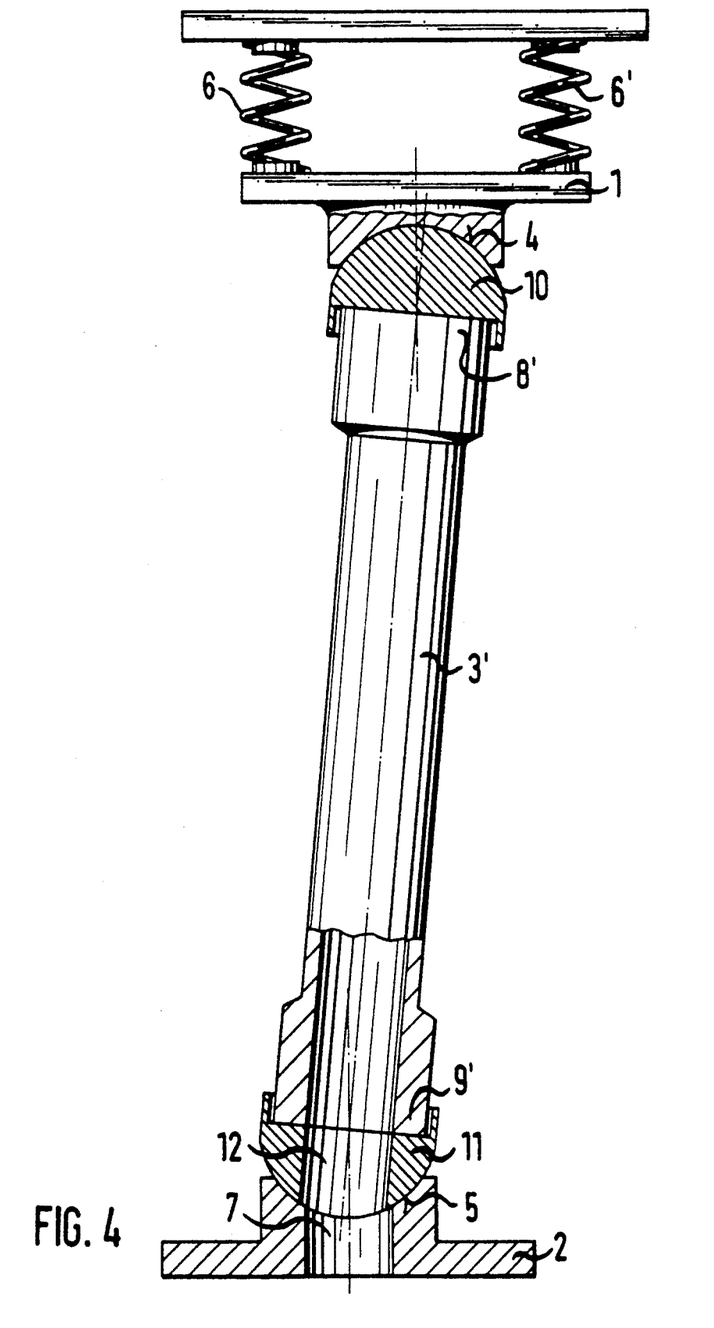
FIG. 4 shows, in a similar view, the filter and mounting of FIG. 3 subjected to an angular shift like that of FIG. 2.

FIG. 4 shows the same construction as FIG. 3 with an angular variation of the position of the filter 3' imposed by requirements for mounting which are such that the holders 1 and 2 are not opposite each other but are somewhat offset from such a position. In a manner analogous to the case of FIG. 2, the tightness of the functions between holders and filter is maintained.

Figure 5:
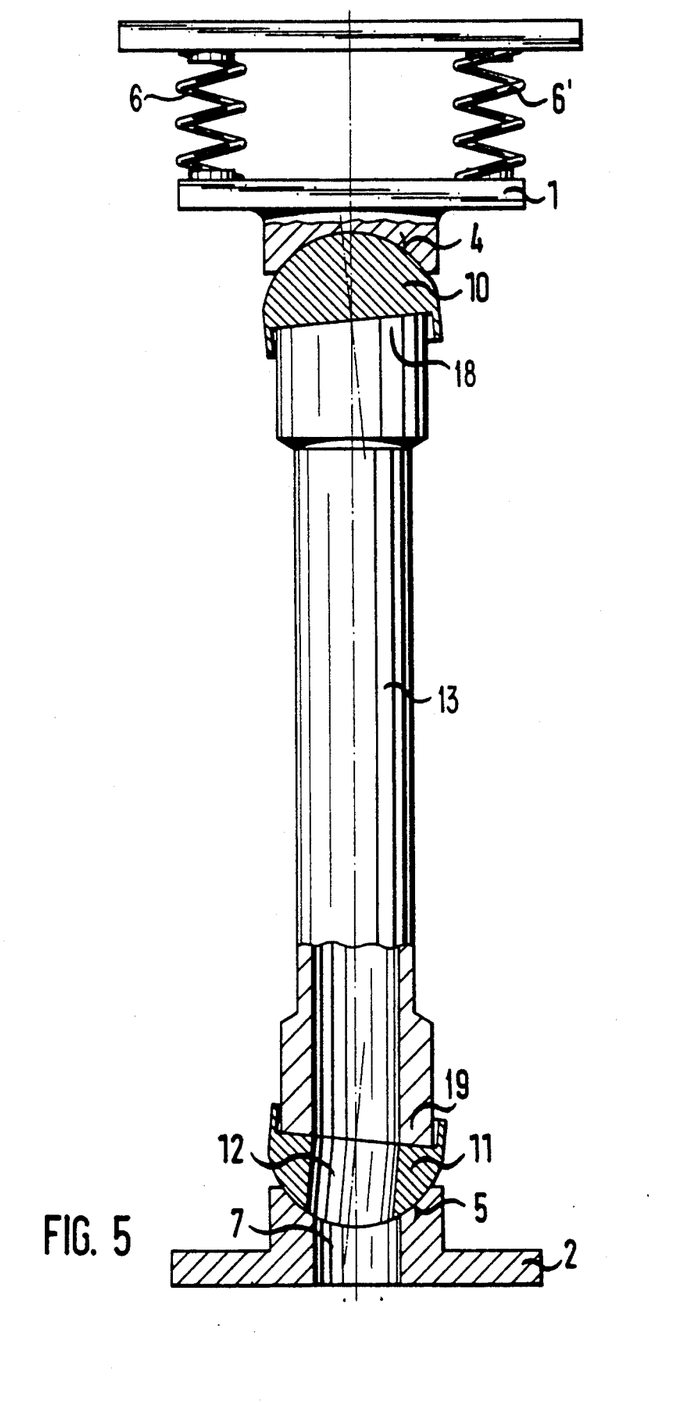
FIG. 5 shows, in an aspect similar to the other FIGURES, the mounting of a tubular filter of which the end planes are not parallel to each other.

FIG. 5 is similar to FIG. 3, but in this case instead of the parallel plane end surfaces of the filter 3' of FIG. 3, the filter 13 of FIG. 5 has end surfaces 18 and 19 which are not parallel and are inclined with respect to each other by a small angle of a few degrees. The same intermediate pieces 10 and 11 are seated on the ends of the filter 13 of FIG. 5 and they are seated slightly obliquely in the spherically concave surfaces 4 and 5 of the holders 1 and 2. As in the cases of FIGS. 2 and 4, however, tight joints are still provided at all junctions, thus both between holder and intermediate piece and between intermediate piece and filter end.

Figure 6:
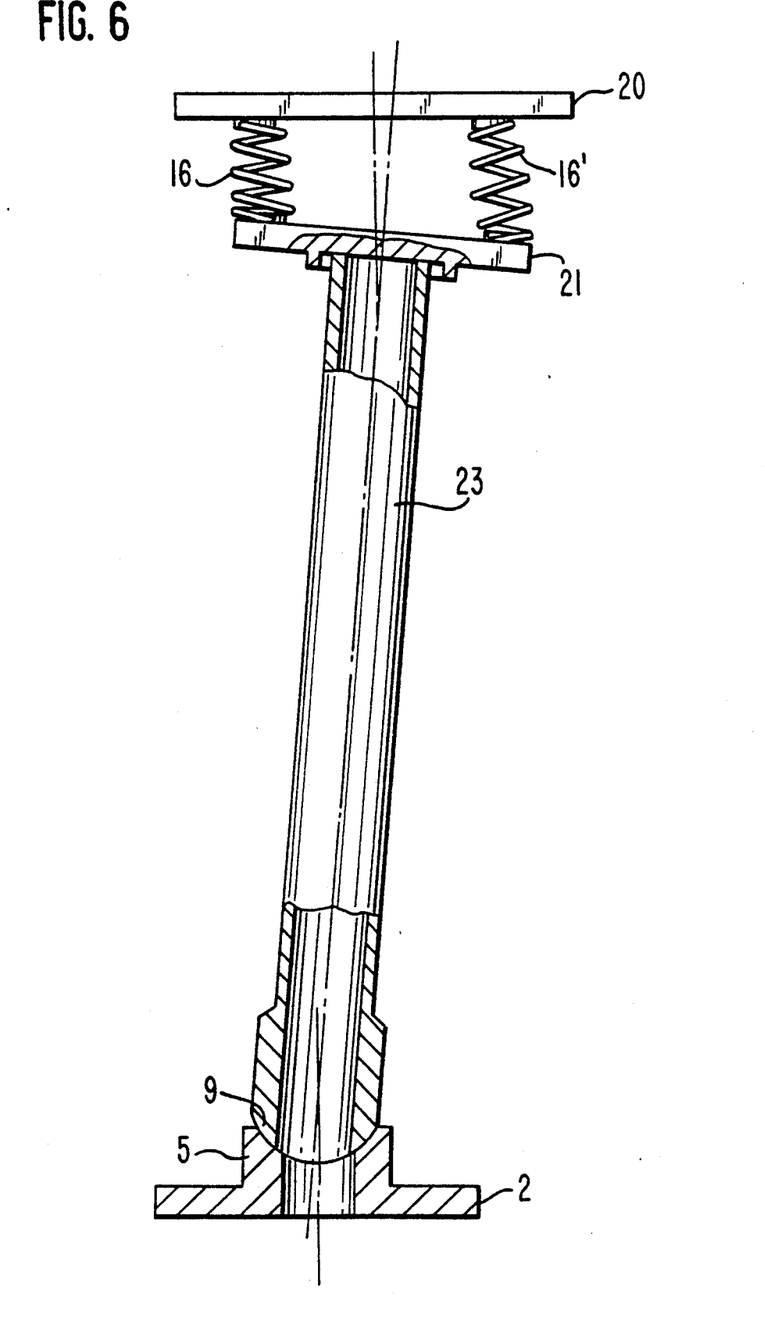
FIG. 6 is a view similar to those of FIGS. 2, 4 and 5 of an embodiment of the invention in which the spring loading provides angular flexibility for the case where the spring loaded holder closes one end of the filter tube.

According to the invention only the mounting at the end of the filter remote from the end at which spring pressure is brought to bear on the filter needs to have a convex spherical surface bearing against a concave spherical surface of the mounting, because coil springs applying pressure to one end of the filter can provide angular as well as axial flexibility while performing their function. This is illustrated in FIG. 6 for the filter open at its ends so that a seal is necessary between the plate 21 and the filter 23, and in FIG. 7 for a filter 23' closed at the top end, where the filter therefore needs only to be held under spring pressure.

The spring-pressed attachment of one of the filter holders is made with care to assure that stresses and consequent displacements are relieved and taken up, whether they arise from thermal expansion or from such lateral deviations, including angular deviation, as are to be expected from dynamism in changing of loads of a large truck and from shifting gears, rapid braking, etc. of a heavy vehicle. It may be important in some cases to provide a lateral limit for the spring-pressed mounting support and thus to prevent deviation of the filter end, for example by means of a cylindrical shell (not shown) attached by a flange thereof on the baseplate 20 on which the springs 6 and 6' are mounted. Of course, the number of springs in the spring-mount is not critical. Their illustration in the drawings is merely schematic. Conceivably a single wider coil spring could be used. The drawings themselves suggest that four springs centered at the corners of a rectangle might well be used.

Figure 8:
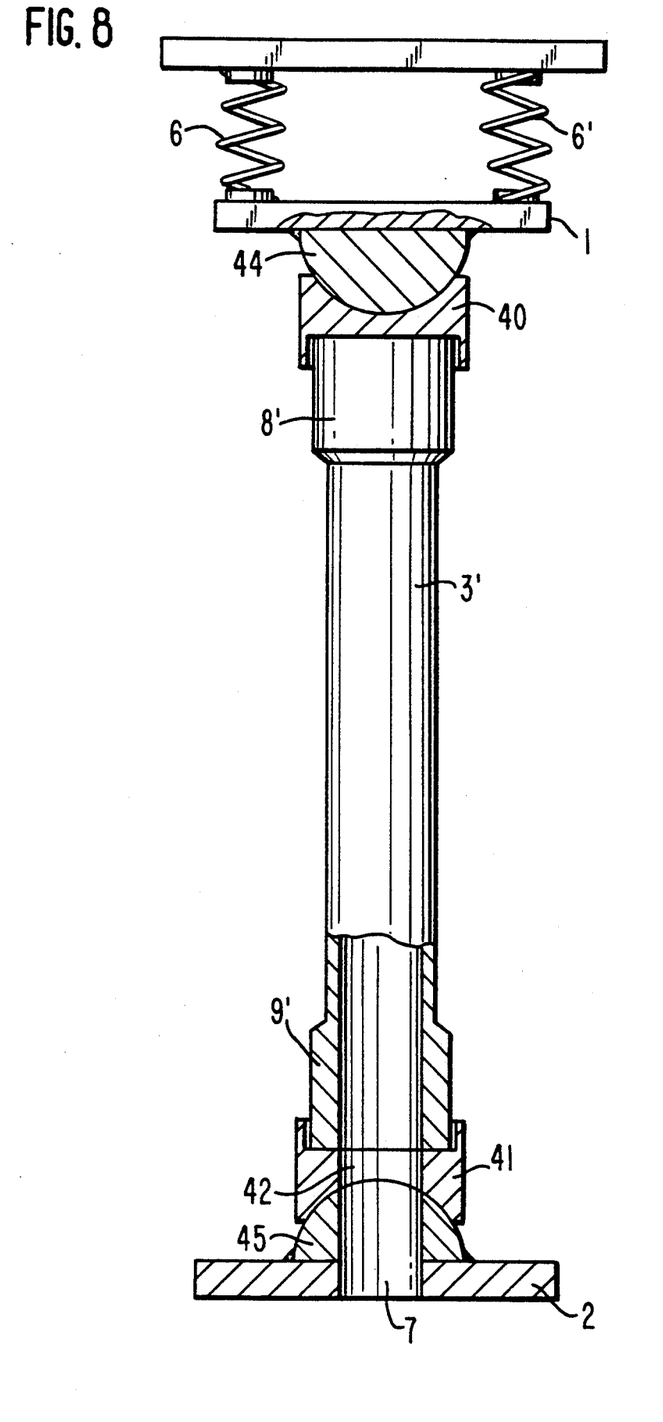
FIG. 8 shows an alternative structure for the mounted filter shown in FIGS. 3 and 4.

The spherically curved surface of the mounting can be convex instead of concave, while the surface bearing on it is concave instead of convex. This possibility is well suited to structures using intermediate pieces 10 and 11 shown in FIGS. 3, 4 and 5. One or both ends of the filter may be so provided. FIG. 8 shows such a structure with spherically convex mounting holders 44 and 45 at the respective ends. The intermediate pieces 40 and 41 respectively have concave surfaces engaging the convex additions 44 and 45 to the respective holder plates 1 and 2.

Figure 7:
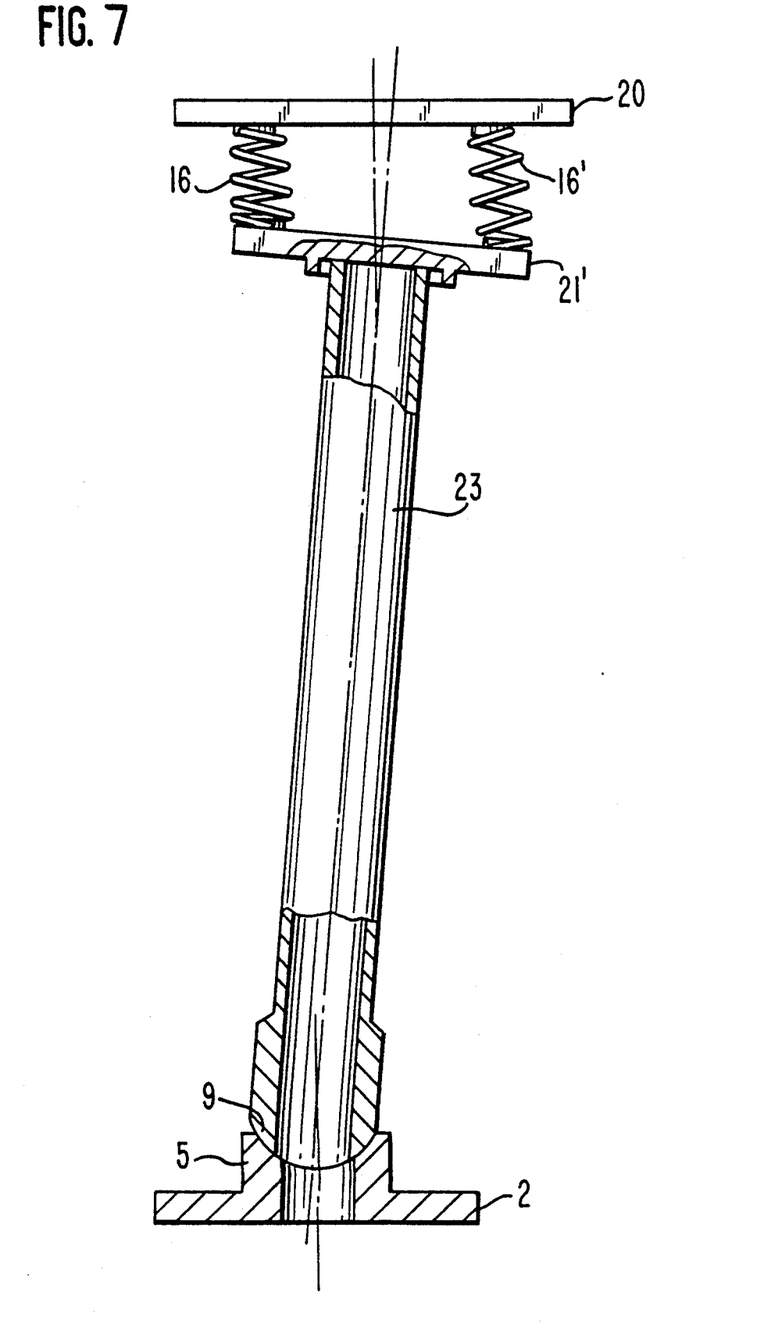
FIG. 7 shows an embodiment like that of FIG. 6 for the case of a filter closed at one end prior to attachment to the spring-loaded holder.

The mounting holders, except where the filter is closed at one end as in FIG. 7, are constructed to serve as seals. That applies even when only the holder has an extensive spherically curved surface and the filter end is simply cut and provides an annular contact over its normal thickness. A tighter seal is of course provided when the end of the filter is thickened and shaped as a fitting piece for the adjacent holder (FIGS. 1 and 2).

It should be observed here that only a relative tightness of seal is required, because the filter itself is porous. The tightness of seal between holder and filter end (with or without an intermediate piece) does not seal to meet any high specifications.

Although the invention has been described with reference to particular illustrative examples, it will be understood that further variations and modifications are possible within the inventive concepts.

We claim:

1. A mounting for a tubular particle filter, comprising first and second holders respectively adjacent to opposite ends of said filter, one of which holders contains a bore (7) for feeding or removal of gaseous or other fluid material to or from the inside of said tubular filter, and resilient fastening means on one of said holders by which the tubular filter, when mounted is subjected to a bias force which opposes loosening the mounting of said filter, wherein said tubular particle filter is closed at its end adjacent to said first holder;

said first holder (1), instead of being rigidly fixed in place, is mounted by a spring attachment to a structure within which said closed end of said tubular filter (3) is mounted and said filter end adjacent to said second holder (2) is thereby pressed against said second holder (2) said structure within which said closed end of said tubular filter is mounted being a first wall of a gas duct, said second holder (2) is mounted on a second wall of said gas duct opposite said first wall of said gas duct has a spherically curved surface (5) facing said filter end adjacent thereto and said same filter end fits snugly, with at least a circle of contact, against said spherical curved surface (5) of said second holder (2).

2. A mounting for a tubular particle filter according to claim 1, wherein said first holder has an unapertured spherically curved surface (4) facing an adjacent filter end fitting thereagainst.

3. A mounting for a tubular particle filter according to claim 1, wherein the unclosed end portion of said tubular filter, the surface of which is pressed into said spherically curved surface of said second holder, is shaped so as to provide an end surface of a convex curvature matching and fitting against said spherically curved surface of said second holder.

4. A mounting for a tubular particle filter according to claim 2, wherein each of said holders have spherically curved surfaces (4,5) which are spherically concave and said filter end adjacent to said second holder is shaped so as to provide an annular surface which is spherically convex and matches in curvature said spherically concave surface of said second holder, and said filter end adjacent to said first holder is shaped so as to provide an unapertured spherically convex surface which matches in curvature a perforated spherically concave surface of said first holder.

5. A mounting for a tubular particle filter according to claim 1, wherein an unattached intermediate piece (11) is seated between said open end (9') of said tubular filter (3') and said spherically curved surface (5) of said second holder (2) which intermediate piece (11) is conformably spherical on its side adjacent to said second holder and is shaped, on its side away from said holder, so as to fit said end (9') of said tubular filter (3'), and said bore (7) in said second holder (2) is extended by a bore (12) compatible therewith in said intermediate piece (11), in a direction towards the interior of said tubular filter (3').

6. A mounting according to claim 4, wherein unattached intermediate pieces (10, 11) are seated between the respective ends of said tubular filter and said respective spherically concave surface (4, 5) of the respective holders (1,2), each of said intermediate pieces being conformably convex and spherical on its side adjacent to said adjacent holder and being shaped, on its side away from said adjacent holder, so as to fit a respective end of said tubular filter, and said bore (7) in said second holder (2) is extended by a bore (12) compatible therewith in said intermediate piece (11) adjacent to said second holder (2) in a direction towards the interior of said tubular filter.

7. A mounting according to claim 2, 4 or 6, wherein said second holder (2) having a said spherically concave surface (5) is rigidly fixed in place.

8. A mounting according to claim 5 or 6, wherein a ductile seal is located between a said intermediate piece and an end of said filter.

9. A mounting according to claim 8 wherein a said ductile seal is of electrically conducting material.

10. A mounting according to claim 8, wherein a said ductile seal is of a material selected from the group consisting of silver, gold, aluminum, graphite and alloys of silver and gold.

* * * * *